United States Patent
Mitomi et al.

(10) Patent No.: US 7,778,497 B2
(45) Date of Patent: Aug. 17, 2010

(54) OPTICAL MODULATORS

(75) Inventors: Osamu Mitomi, Sagamihara (JP); Kenji Aoki, Nagoya (JP); Tetsuya Ejiri, Kasugai (JP); Akiyoshi Ide, West Bloomfield, MI (US); Jungo Kondo, Nishikamo-Gun (JP); Yuichi Iwata, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 0 days.

(21) Appl. No.: 12/401,753

(22) Filed: Mar. 11, 2009

(65) Prior Publication Data
US 2009/0232439 A1 Sep. 17, 2009

(30) Foreign Application Priority Data
Mar. 13, 2008 (JP) .............................. P2000-064101

(51) Int. Cl.
*G02F 1/035* (2006.01)
*G02B 6/26* (2006.01)

(52) U.S. Cl. .................. 385/2; 385/40; 385/50

(58) Field of Classification Search ............ 385/2, 385/40, 50
See application file for complete search history.

(56) References Cited

U.S. PATENT DOCUMENTS

| | | | |
|---|---|---|---|
| 6,219,469 B1* | 4/2001 | Minakata et al. | 385/2 |
| 6,999,643 B2* | 2/2006 | Kikuchi et al. | 385/14 |

FOREIGN PATENT DOCUMENTS

| | | |
|---|---|---|
| JP | 04-355714 A1 | 12/1992 |
| JP | 2004-245991 A1 | 9/2004 |
| JP | 2005-173162 A1 | 6/2005 |
| WO | 2008/099950 A1 | 8/2008 |

OTHER PUBLICATIONS

Takashi Yamada, et al., "Highly Functional Hybrid Modules Using Low Loss Direct Attachment Technique with Planar Lightwave Circuit and LiNbO₃ Devices," 10th International Symposium on Microwave and Optical Technology, 2005, pp. 107-110.
U.S. Appl. No. 12/407,904, filed Mar. 20, 2009, Hamajima et al.
U.S. Appl. No. 12/499,921, filed Jul. 9, 2009, Aoki et al.

* cited by examiner

Primary Examiner—Jerry T Rahll
(74) Attorney, Agent, or Firm—Burr & Brown

(57) ABSTRACT

An optical modulator having an optical modulation part and a connection part for an optical fiber propagating light. The optical modulation part has a modulation substrate of an electro-optic material, a modulation optical waveguide formed on the modulation substrate, a high frequency interaction part for applying a voltage to the modulation optical waveguide to modulate the propagation of light, a first supporting substrate and a first adhesion layer for adhering the modulation substrate to the first supporting substrate. The connection part has a connection substrate of an electro-optic material, a connection optical waveguide formed on the connection substrate, a second supporting substrate, and a second adhesion layer for adhering the connection substrate to the second supporting substrate. The modulation substrate is adhered to the connection substrate. The first supporting substrate is adhered to the second supporting substrate. The modulation optical waveguide is connected to the connection optical waveguide.

7 Claims, 7 Drawing Sheets

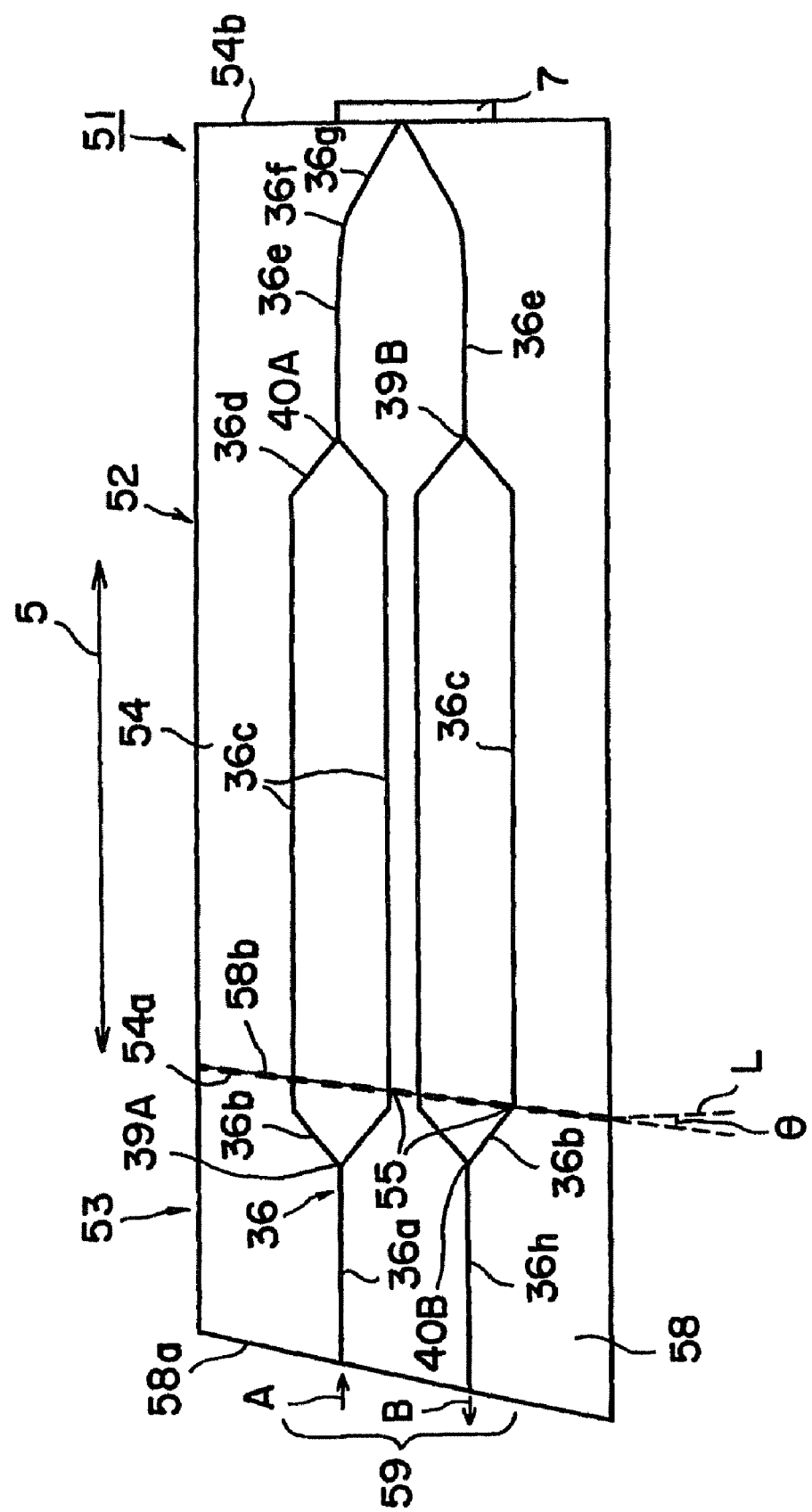

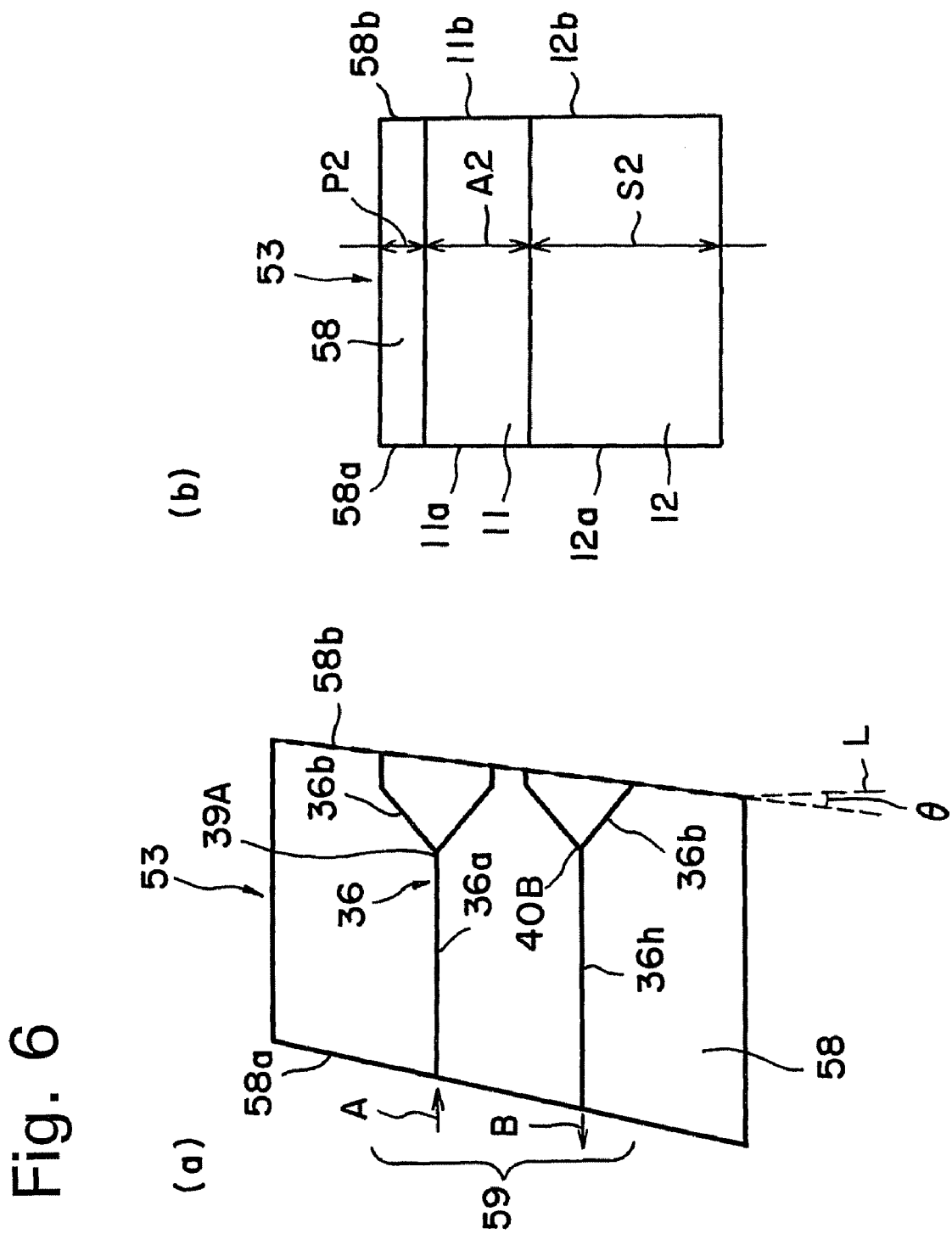

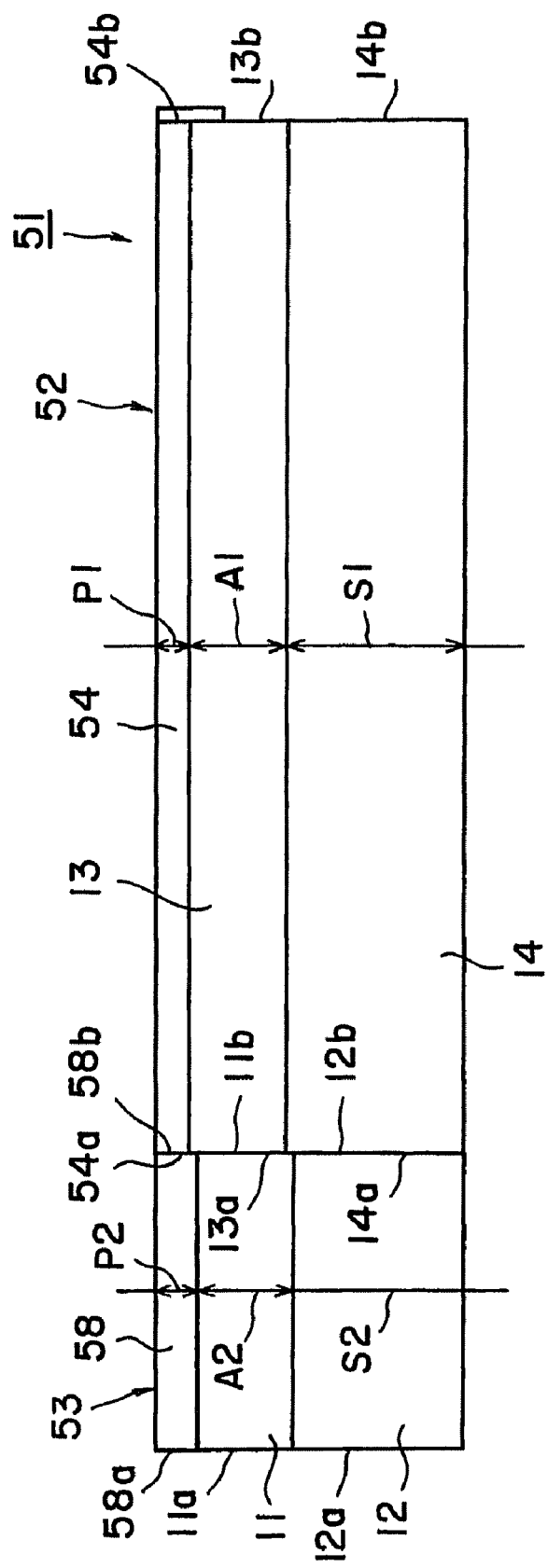

OPTICAL MODULATORS

This application claims the benefit of Japanese Patent Application P2008-64101 filed on Mar. 13, 2008, the entirety of which is incorporated by reference.

FIELD OF THE INVENTION

The present invention relates to an optical modulator such as a traveling wave optical modulator.

BACKGROUND OF THE INVENTION

Japanese Patent Publication No. H04-355714A discloses that light waves and modulated waves are increased in interaction length by folding optical waveguides of an optical control element at an end surface of a substrate, and consequently, the driving voltage is made low and the velocity mismatch between the lightwaves and signal waves are compensated to realize the high-speed operation.

In "Highly Functional Hybrid Modules Using Low Loss Direct Attachment Technique with Planar Lightwave Circuit and LiNbO$_3$ Devices" T. Yamada et al. "ISMOT-2005" pp.107-110, 2005, disclosed is that a PLC (Planar Lightwave Circuit) and an LN (LiNbO$_3$) waveguide device are connected. Further, in Japanese Patent Publication No. 2005-173162A, disclosed is that the PLC and the LN waveguide device are connected, and that on this occasion, since mode field diameters of optical waveguides are different from each other between the two substrates, a tapered part for adjusting the mode field diameters is provided between the substrates.

In addition, in Japanese Patent Publication No. 2004-245991A, a so-called fixture structure is disclosed.

SUMMARY OF THE INVENTION

In WO 2008/099950 A1, the present applicant discloses that an optical modulation substrate including a high frequency interaction part and a thick passive substrate connected to an optical fiber are made separately, and both of the substrates are adhered to be formed into one optical modulator.

In the high frequency interaction part of the optical modulator, an electrode gap must be narrowed to reduce a driving voltage. On the other hand, a thickness of the modulator substrate needs to be 10 μm or less, particularly thinned up to 5 μm or less in order that the electrode gap may be narrowed, characteristic impedance matching is kept, and velocity matching between lightwaves and microwaves is realized at the same time.

When a titanium diffused optical waveguide, for example, is formed on such an extremely thin lithium niobate substrate, a mode size in the thickness direction of the substrate is restricted by a thickness of the substrate, and therefore, the mode field shape of the optical waveguide laterally has a low profile and oval shape. Meanwhile, an optical fiber to be connected has a round shape with a mode field diameter of about 10 μm. Therefore, when the optical waveguide formed on the thin lithium niobate substrate is connected to the optical fiber in the outside, an insertion loss increases.

An object of the present invention is to provide an optical modulator having a radio frequency interaction part for applying a voltage to light propagating through a branched type optical waveguide and for modulating the light, in which an optical insertion loss due to a mismatch in the mode field diameter between optical fiber propagating light and propagation light through the optical waveguide is reduced.

The present invention provides an optical modulator comprising an optical modulation part and a connection part for optical fiber propagating light:

the optical modulation part comprising a modulation substrate comprising an electro-optic material, a modulation optical waveguide formed on the modulation substrate, a radio frequency interaction part for applying a voltage to the modulation optical waveguide and for modulating propagation light, a first supporting substrate and a first adhesion layer for adhering the modulation substrate to the first supporting substrate;

the connection part comprising a connection substrate comprising an electro-optic material, a connection optical waveguide formed on the connection substrate, a second supporting substrate, and a second adhesion layer for adhering the connection substrate to the second supporting substrate; and wherein the modulation substrate is adhered to the connection substrate, the first supporting substrate is adhered to the second supporting substrate, the modulation optical waveguide is connected to the connection optical waveguide, and a thickness of the modulation substrate is smaller than that of the connection substrate.

According to the present invention, a part for performing a radio frequency interaction and an optical connection part to receive or emit optical fiber propagating light are configured using separate chips as described above. A thickness of the connection part for connecting the optical fiber propagating light thereto is set to be larger than that of the modulation substrate for performing a radio frequency interaction. Thereby, an insertion loss at the time of receiving or emitting the optical fiber propagating light to or from the modulator can be reduced.

In addition to the above, when a single thick optical fiber connection substrate is adhered to the thin modulation substrate and the supporting substrate, a difference in the mode field diameter between the connection substrate and the modulation substrate is present, and therefore, the optical insertion loss due to the difference is found. Further, the modulation substrate is extremely thin, and a thickness of the supporting substrate and the adhesion layer is larger than that of the modulation substrate. Therefore, temperature fluctuations in modulation characteristics may be caused by a mismatch due to thermal expansion between the adhesion layer and the connection substrate.

According to the present invention, the connection substrate is adhered to the radio frequency modulation substrate, and at the same time, each supporting substrate below both the substrates is adhered to each other. Thereby, a difference of a thickness between the connection substrate and the modulation substrate can be reduced, and therefore, the optical insertion loss due to a difference of the mode field diameter between the connection substrate and the modulation substrate can be more reduced. Further, the mismatch due to thermal expansion between the adhesion layer below the modulation substrate and the connection substrate has little influence, and no temperature fluctuations are occurred in modulation characteristics due to the above influence.

In "Highly Functional Hybrid Modules Using Low Loss Direct Attachment Technique with Planar Lightwave Circuit and LiNbO$_3$ Devices" T. Yamada et al. "ISMOT-2005" pp.107-110, 2005, and in Japanese Patent Publication No. 2005-173162A, disclosed is that two kinds of different optical waveguide substrates are connected with each other, and specifically that a lithium niobate optical modulator and a PLC (silica-based planar lightwave circuit), for example, are connected to thereby fabricate an optical time division multiplexing module. However, the optical modulator and the PLC each perform separate functions, and it is not supposed that the optical modulator itself is divided into an active part (optical modulation operation part) and a connection part. Further, when both the optical waveguide substrates made of different materials such as the lithium niobate optical modulator and the PLC are joined as the connection substrate, a mismatch due to a linear expansion coefficient largely occurs, which leads to a problem from the viewpoint of reliability of the device and stability of the modulation operation.

BRIEF DESCRIPTION OF THE DRAWINGS

FIG. 5 is a plan view showing an optical modulator 51 according to another embodiment of the present invention.

FIG. 6(a) is a plan view showing a connection substrate 53, and FIG. 6(b) is a side view showing the connection substrate 53.

FIG. 7 is a side view showing the optical modulator 51.

DETAILED DESCRIPTION OF THE INVENTION

In the present invention, a "radio frequency interaction part" means an area in which a radio frequency voltage is applied to an optical waveguide and light is modulated. The radio frequency voltage here means a voltage with a frequency of 1 GHz or more.

An electrode of the above-described modulation is not limited to a so-called CPW (coplanar waveguide) type optical modulator, but can be applied to optical modulators with various shapes. The present invention can be applied to, for example, a so-called ACPS type optical modulator or independent modulation type optical modulator.

FIGS. 1 to 4 show an example where the present invention is applied to a so-called SSB modulator.

Figure 1:
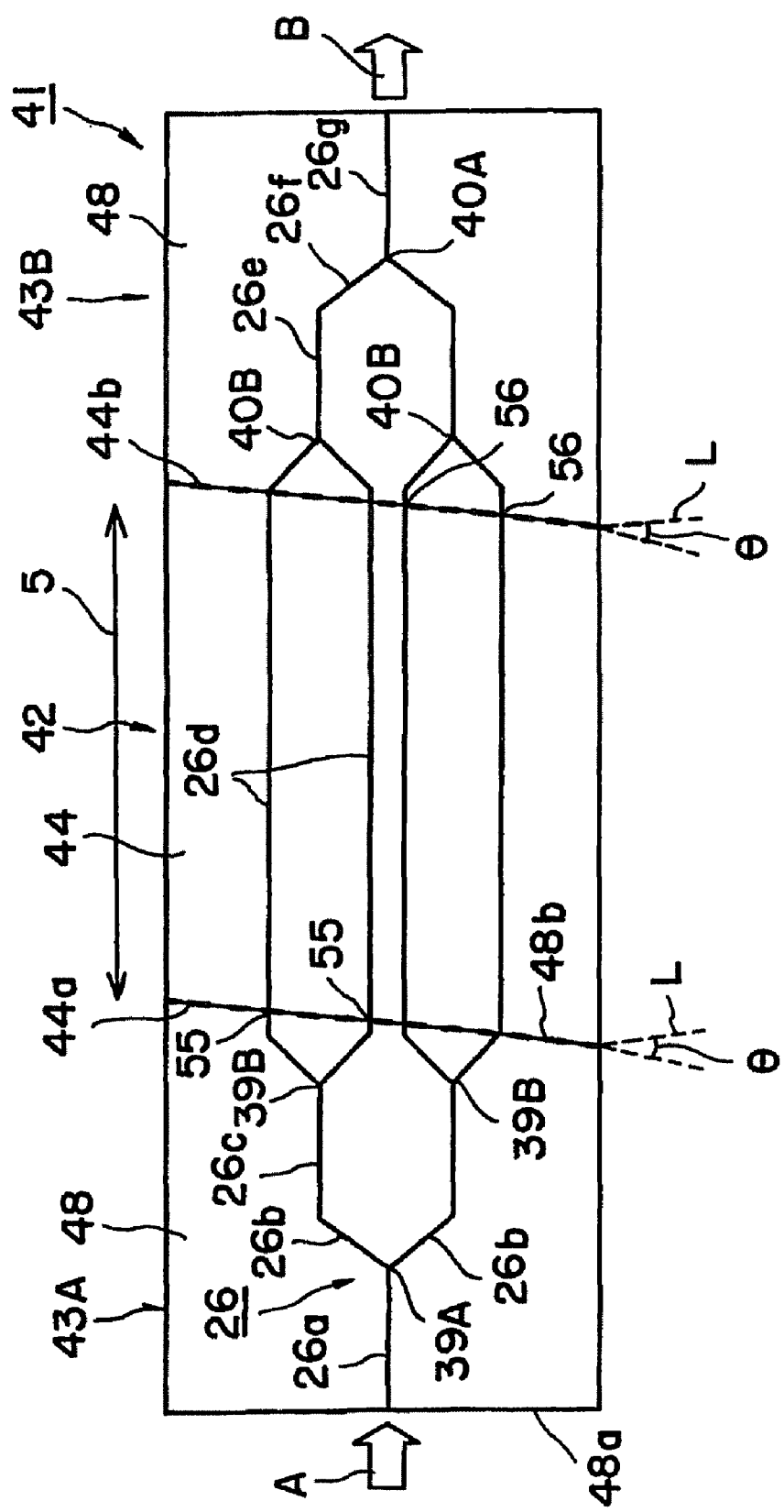
FIG. 1 is a plan view showing an optical modulator 41 according to one embodiment of the present invention.

FIG. 1 is a plan view showing an optical modulator 41, FIG. 2(a) is a plan view showing a connection part 43A (43B), and FIG. 2(b) is a side view showing the connection part 43A (43B). FIG. 3(a) is a plan view showing a modulation part 42, FIG. 3(b) is a side view showing the modulation part 42, and FIG. 4 is a side view showing the optical modulator 41.

As shown in FIGS. 3(a) and 3(b), the optical modulation part 42 includes a modulation substrate 44, a supporting substrate 4, and a low dielectric layer 3 for adhering both of the substrates 44 and 4. On the modulation substrate 44, optical waveguides 26d are extended from one end surface 44a to another end surface 44b. On the end surface 44a of the part 42, an end surface 55 of the optical waveguide is formed and exposed. Meanwhile, on the end surface 44b on the opposite side of the part 42, an end surface 56 of the optical waveguide is exposed. For example, four lines of second branched parts 26d in total are formed between the end surfaces 44a and 44b.

Figure 2:
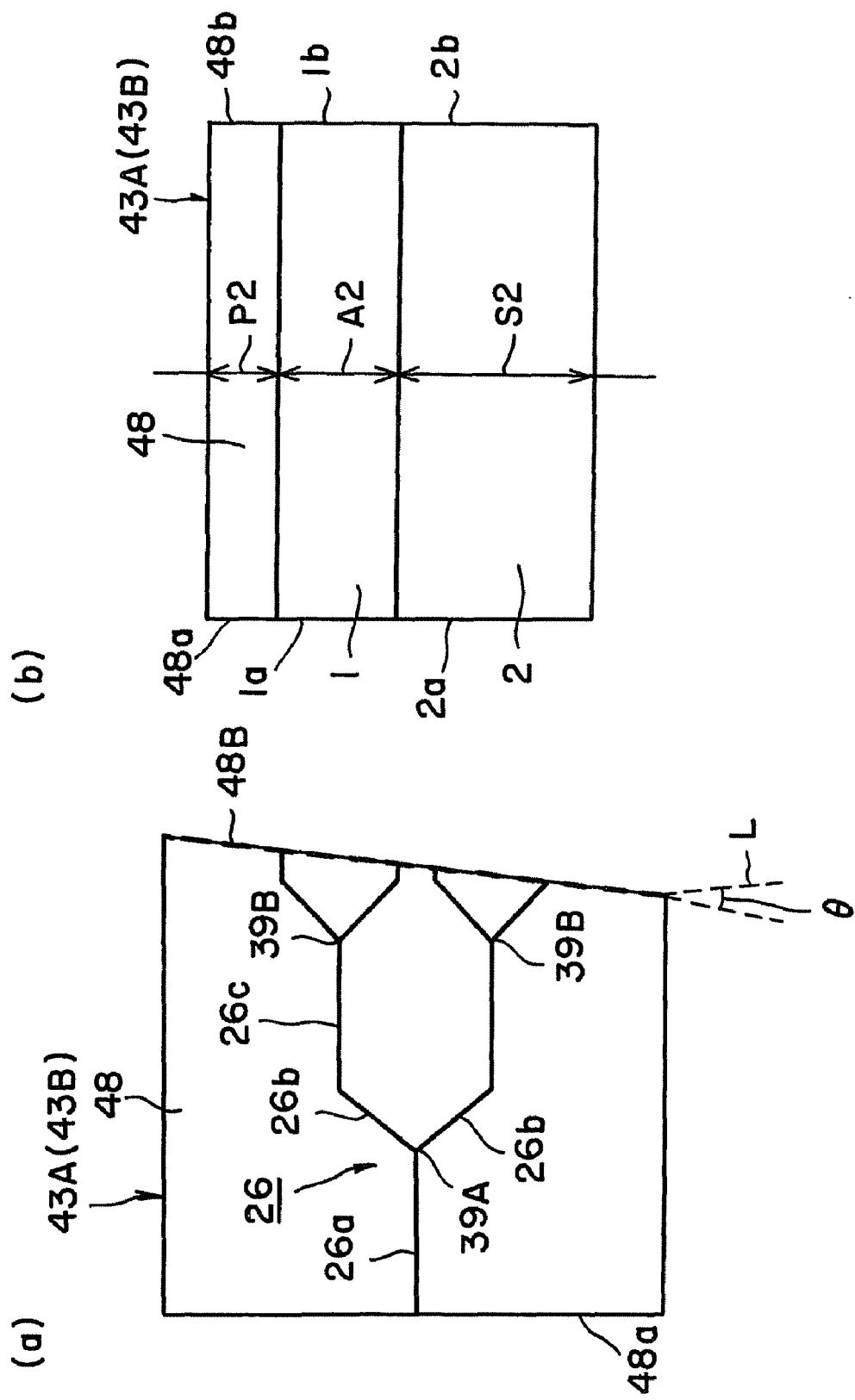
FIG. 2(a) is a plan view showing a connection part 43A.
FIG. 2(b) is a side view showing the connection part 43A.
Figure 3:
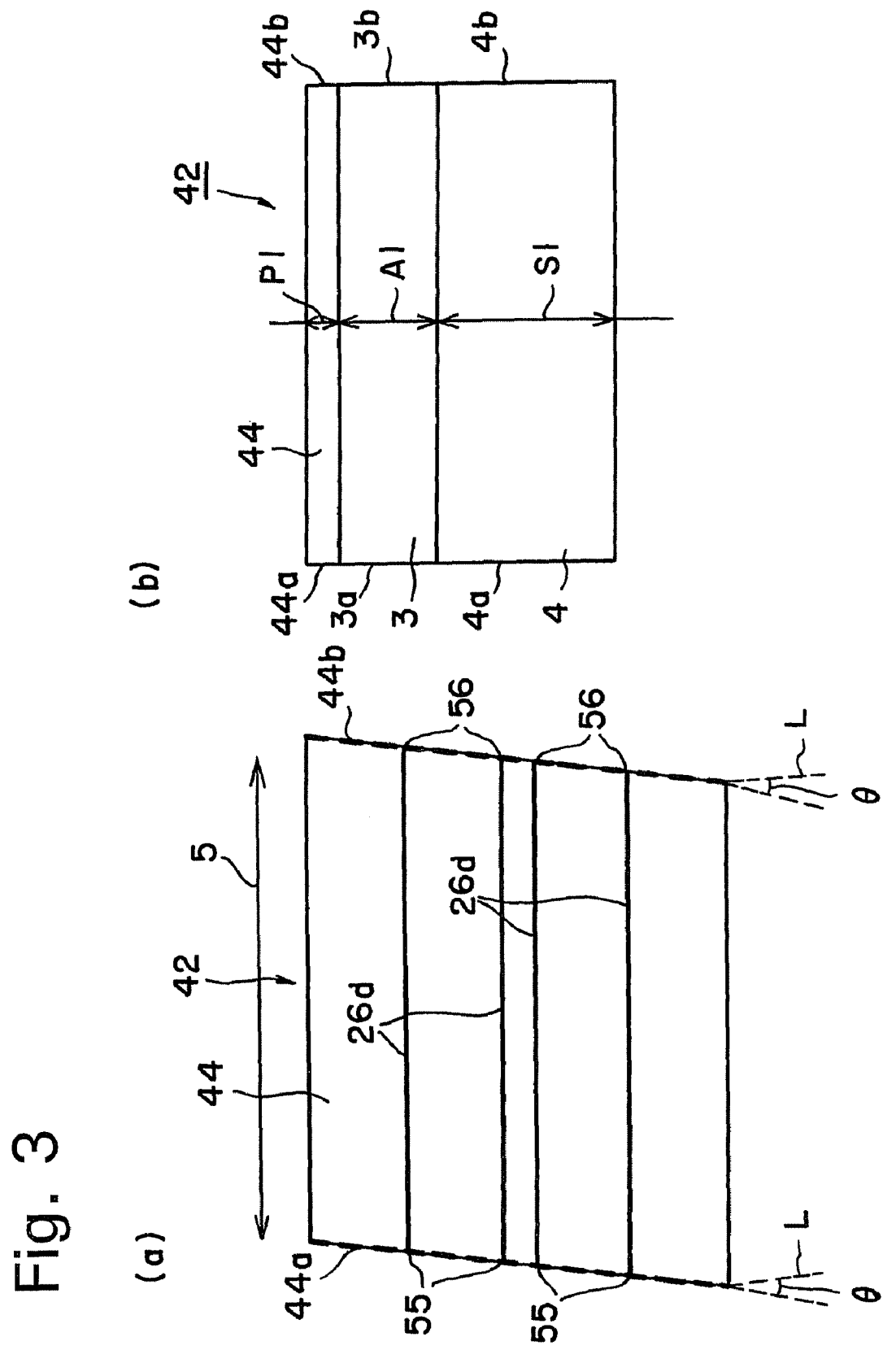
FIG. 3(a) is a plan view showing a modulation substrate 42.
FIG. 3(b) is a side view showing the modulation substrate 42.
Figure 4:
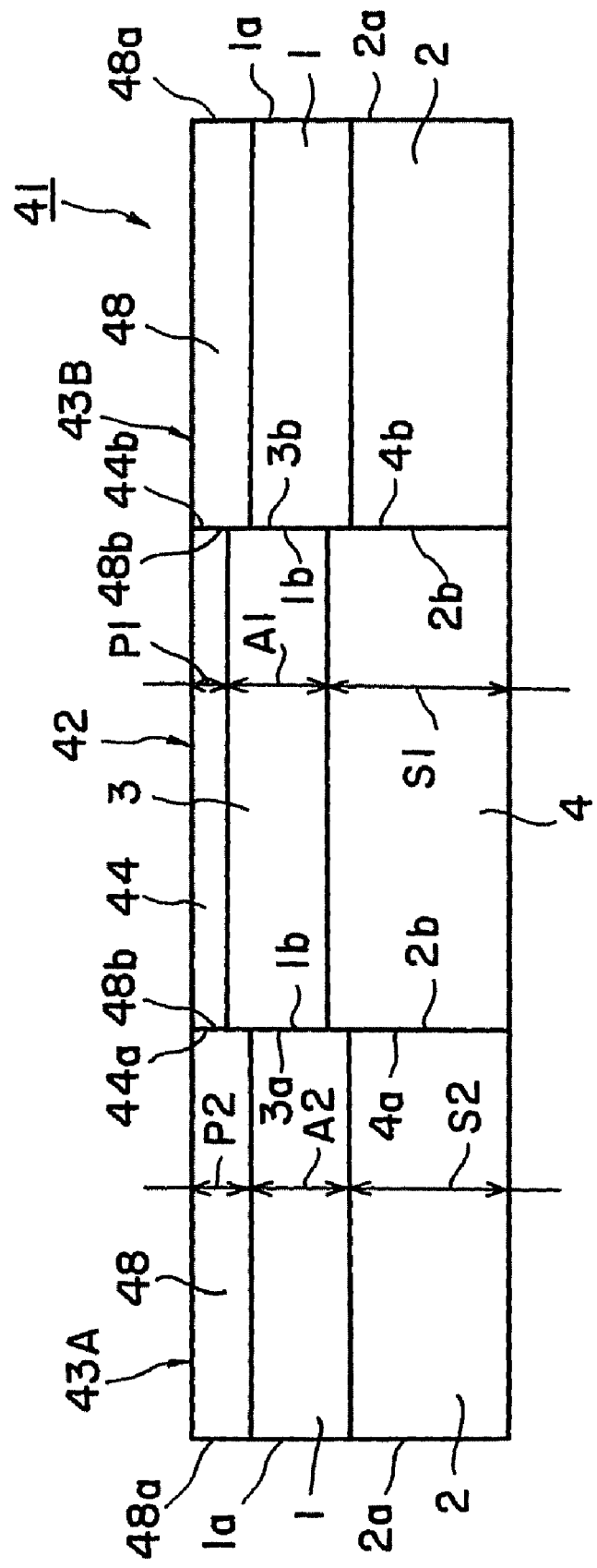
FIG. 4 is a side view showing the optical modulator 41.

The connection parts 43A and 43B of FIGS. 1, 2, and 4 each include a substrate 48. In the connection part 43A of a light incident side, an incident part 26a, first branched parts 26b and 26c, and ends of second branched parts are formed on the substrate 48. In the connection part 43B of a light output side, a output part 26g, first branched parts 26e and 26f, and ends of second branched parts are formed on the substrate 48.

The connection parts 43A and 43B are joined to both of the end surfaces of the optical modulation part 42, respectively, thereby manufacturing the optical modulator 41. In the present embodiment, a joint surface 48b of each connection substrate 48 is adhered to joint surfaces 44a and 44b of the modulation substrate 44 and to upper portions of end surfaces 3a and 3b of the adhesion layer 3. Further, an end surface 1b of a second adhesion layer 1 is adhered to end surfaces 3a and 3b of the first adhesion layer 3 and to end surfaces 4a and 4b of the first supporting substrate 4, and an end surface 2b of a second supporting substrate 2 is adhered to the end surfaces 4a and 4b of the first supporting substrate 4.

In the present example, as shown in FIG. 1, optical fiber propagating light is made incident from the end 26a of an optical waveguide 26 as indicated by an arrow A, and demultiplexed by a demultiplexing section 39A. Then, the light passes through the first branched parts 26b and 26c, demultiplexed by a demultiplexing section 39B again, and made incident to second branched parts 26d. Further, the light is modulated within the branched parts 26d. Subsequently, the light propagating through the branched parts 26d is multiplexed by a multiplexing section 40B and passes through the first branched parts 26e and 26f. Further, the light is multiplexed by a multiplexing section 40A and passes through the output part 26g, thereby emitting outwards from the modulator as indicated by an arrow B.

It should be noted that, in the present example, both of the incident light indicated by the arrow A and the output light indicated by the arrow B act as the optical fiber propagating light. Further, in both of the light incident part and the light output part, a pigtail connection can be directly made using an optical fiber to the connection parts 43A and 43B. Alternatively, an optical fiber can be connected to the optical waveguide of each connection part through a lens connection. In either case, the optical fiber propagating light is connected to each connection part.

FIGS. 5 to 7 show an example where the present invention is applied to a so-called CSRZ modulator. FIG. 5 is a plan view showing an optical modulator 51. FIG. 6(a) is a plan view showing a connection part 53, and FIG. 6(b) is a side view showing the connection part 53. FIG. 7 is a side view showing the optical modulator 51.

An optical modulation part 52 includes a modulation substrate 54, a first supporting substrate 14, and a first adhesion layer 13 for adhering both of the substrates 54 and 14. On the modulation substrate 54, an optical waveguide 36 is extended from a joint surface 54a to an end surface 54b. Specifically, first branched parts 36c and 36d with four lines, a multiplexing section 40A, a demultiplexing section 39B, waveguide parts 36e and 36f, and a reflection part 36g are provided on the modulation substrate 54. On the joint surface 54a of the part 52, an end surface 55 of the optical waveguide 36 is formed and exposed. Meanwhile, on an end surface 54b of the part 52, a reflection material 7 is formed.

As shown in FIG. 6, the connection part 53 includes a substrate 58. On the substrate 58, an incident part 36a, an output part 36h, a branched part 39A, a multiplexing section 40B, and first branched parts 36b are formed.

The connection part 53 is joined to the joint surface 54a of the optical modulation part 52, thereby manufacturing the optical modulator 51. As shown in FIG. 7, for example, a joint surface 58b of the connection substrate 58 is adhered to the joint surface 54a of the modulation substrate 54 and to an upper portion of an end surface 13a of the adhesion layer 13. An end surface 11b of a second adhesion layer 11 is adhered to the end surface 13a of the first adhesion layer 13 and an end surface 14a of the first supporting substrate 14. Further, an end surface 12b of a second supporting substrate 12 is adhered to the end surface 14a of the first supporting substrate 14.

In the present example, light made incident from the incident part 36a of the optical waveguide 36 is demultiplexed by the demultiplexing section 39A and propagates through the branched part 36b to be modulated at the branched part 36c. Subsequently, light propagating through the branched part 36d is multiplexed by the multiplexing section 40A and passes through the waveguide parts 36e and 36f and the reflection part 36g to be reflected by the reflection material 7. Subsequently, the light passes through the reflection part 36g and the waveguide part 36e and is demultiplexed by the demultiplexing section 39B, thereby being subjected to predetermined modulation at the branched part 36c. Subsequently, the light passes through the branched part 36b and is multiplexed by the multiplexing section 40B, thereby emitting from the output part 36h.

In the present invention, for example, as shown in FIGS. 4 and 7, the modulation substrates 44 and 54 are adhered to the connection substrates 48 and 58, and the first supporting substrates 4 and 14 are adhered to the second supporting substrates 2 and 12. Further, the modulation optical waveguide is connected to the connection optical waveguide and a thickness P1 of the modulation substrate is smaller than a thickness P2 of the connection substrate.

From the viewpoint of the effect of the present invention, a difference between the thickness P1 of the modulation substrate and the thickness P2 of the connection substrate is preferably 0.5 μm or more, more preferably 2 μm or more, and most preferably 4 μm or more.

On the other hand, when a difference between the thickness P1 of the modulation substrate and that the thickness P2 of the connection substrate is set to 20 μm or less, an optical insertion loss due to a difference in a mode field diameter between the connection substrate and the modulation substrate can be more reduced, and an influence of mismatch in the thermal expansion coefficient between the adhesion layer and the connection substrate can also be suppressed. From the viewpoint of the above-described fact, a difference between the thicknesses P1 and P2 is more preferably 10 μm or less.

Further, from the viewpoint of characteristic impedance matching and velocity matching between light waves and microwaves, the thickness P1 of the modulation substrate is preferably 10 μm or less, and more preferably 5 μm or less.

In a preferred embodiment, the connection substrate is adhered also to the first adhesion layer.

A thickness S1 of the first supporting substrate and a thickness S2 of the second supporting substrate (see FIGS. 2, 4, 6, and 7) are not particularly limited; however, from the viewpoint of handling of components, preferably 100 μm or more, and more preferably 500 μm or more.

A thickness A1 of the first adhesion layers 3 and 13, and a thickness A2 of the second adhesion layers 1 and 11 are not particularly limited; however, preferably 10 μm or more from the viewpoint of the velocity matching between lightwaves and microwaves. Further, from the viewpoint of stress relaxation accompanying linear expansion coefficient difference in the joint part, the thicknesses A1 and A2 are preferably 1000 μm or less, and more preferably 100 μm or less.

On the optical modulation substrate or the connection substrate, an electrode for adjusting a phase may be provided to shift a bias point. The electrode for adjusting a phase is a driving electrode to adjust a dc bias point. As the frequency of this driving voltage, for example, a frequency of 1 KHz to 400 MHz is used.

Further, on the optical waveguide, the multiplexing section and the demultiplexing section may be provided as shown in the above-described respective embodiments. In this case, the multiplexing section and the demultiplexing section may be provided on the optical modulation substrate or on the connection substrate. The connection substrate has an advantage over the modulation substrate in that when the multiplexing section and the demultiplexing section are formed on the connection substrate, a thickness of the connection substrate is larger than that of the modulation substrate, and therefore, the propagation light can be easily made into a single mode and an extinction ratio can be easily improved.

The optical waveguide may be a ridge type optical waveguide directly formed on one main surface of the modulation substrate and the connection substrate, or a ridge type optical waveguide formed on one main surface of each substrate via another layer. Alternatively, the optical waveguide may be an optical waveguide formed by inner diffusion process or ion exchange process within each substrate, for example, titanium diffused optical waveguide or proton-exchanged optical waveguide. Specifically, the optical waveguide may be a ridge-type optical waveguide protruding from the surface of the substrate. The ridge type optical waveguide may be formed by laser or mechanical processing. Alternatively, a high refractive index film is formed on the substrate, and this high refractive index film is then subjected to mechanical or laser ablation processing to form a ridge type three dimensional optical waveguide. The high refractive index film may be formed by, for example, chemical vapor deposition, physical vapor deposition, metal organic chemical vapor deposition, sputtering or liquid phase epitaxy methods.

In the above-described respective examples, the electrode is formed on the surface of the modulation substrate. Specifically, the electrode may be directly formed on the surface of the modulation substrate, or on a low dielectric layer or buffer layer. The low dielectric layer may be made of any known material such as silicon dioxide, magnesium fluoride, silicon nitride, and alumina. The low dielectric layer herein means a layer made of a material having a dielectric constant lower than that of a material constituting this substrate.

A material constituting the modulation substrate and the connection substrate includes an electro-optic material having ferroelectricity, and preferably includes a single crystal. This crystal is not particularly limited as far as light modulation is enabled, but includes, for example, lithium niobate, lithium tantalate, lithium niobate-lithium tantalate solid solution, potassium lithium niobate, KTP, GaAs and quartz.

A material of the supporting substrate may further include a glass such as quartz glass or the like in addition to the above-described electro-optic material having ferroelectricity.

Further, in a preferred embodiment, the modulation substrate and the connection substrate are composed of the same kind of material. The same kind of material herein means that two materials may have the same basic composition regardless of the presence or absence of doping components. The junction of the optical modulation substrate and connection substrate composed of the same kind of material as described above is considered to be unnatural and unimaginable from Japanese Unexamined Patent Application Publication No. 2005-173162A which is disclosed based on the junction of different kind of functional components composed of different kind of materials.

Such adhesive agent for adhering the modulation substrate or the connection substrate to the supporting substrate is made of a material having a dielectric constant lower than that of a material constituting the modulation substrate. Specific examples of the adhesive agent are not particularly limited as far as it satisfies the above-described conditions, but includes an epoxy adhesive, a thermosetting type adhesive, an ultraviolet curable adhesive, and ALON CERAMICS C (trade name, manufactured by Toagosei Co., Ltd.)(thermal expansion coefficient: $13 \times 10^{-6}$/K).

A method for joining the modulation substrate and the connection substrate is not particularly limited but can be exemplified below. In order to join the modulation substrate and the connection substrate, the joint can be performed using an optical alignment machine operable with sub-micron accuracy. The modulation substrate and the connection substrate are fixed to the special jig of the optical alignment machine, respectively. The optical axis of the optical fiber is first adjusted with that of the optical waveguide on the modulation substrate at a position where an optical power emitted from the optical waveguide is maximized. Next, the optical axis of the optical waveguide on the modulation substrate is adjusted with that of the optical waveguide on the connection substrate. Thereafter, both of the optical waveguides are joined with an ultraviolet curable resin adhesive.

The swing adjustment between chips need not be adjusted with assembling accuracy of the special jig provided on the alignment machine; however, the adjustment can be performed with swing alignment of the alignment machine when requiring high accuracy. The fixture structure may be provided on the joint surfaces between both the modulation substrate and the connection substrate and on the joint surface between the substrate and the optical fiber. In this case, fluctuations of an optical output due to the change of the environmental temperature can be suppressed. This fixture structure is described, for example, in Japanese Patent Application Laid-Open No. 2004-245991A.

When the modulation substrate and the connection substrate are adhered to each other, an adhesive agent is not particularly limited, but includes an epoxy adhesive, a thermosetting type adhesive, an ultraviolet curable adhesive, and ALON CERAMICS C (trade name, manufactured by Toagosei Co., Ltd.) (thermal expansion coefficient: $13 \times 10^{-6}$/K).

In the above-described respective examples, cases where the present invention is applied to an amplitude modulator is described; further, the present invention can be applied also to a phase modulator where the arrangement of the optical waveguide is different from that of the amplitude modulator.

In a preferred embodiment, in order to secure excellent reflection attenuation characteristics, the joint surfaces 44a, 44b, and 54a of the modulation substrate are inclined to a plane L perpendicular to a traveling direction of propagation light in the branched part (see FIGS. 1, 3, 5, and 6). This inclination angle θ is not particularly limited; however, when a spot size diameter of the optical waveguide is 10 µm, the inclination angle is preferably 1 degree or more, and preferably 30 degrees or less. It should be noted that, since a preferable θ depends on the spot size diameter of the optical waveguide to be connected, a preferable θ is likely to be smaller than the above value in the case where the spot size diameter is larger than 10 µm, and on the contrary, the preferable θ is likely to be larger than the above value in the case where the spot size diameter is smaller than 10 µm.

In FIGS. 1, 3, 5, and 6, the inclination angle θ is provided in the width direction of chips; however, the inclination angle θ may also be provided in the thickness direction of chips.

Further, even when using an antireflection coat on the end surface, the reflection attenuation can be improved. Therefore, while securing a preferable reflection attenuation amount, the inclination angle θ can be set to zero degree.

Further, when the titanium diffused optical waveguide is used as each optical waveguide on the modulation substrate and on the connection substrate, the thickness of the titanium layer for forming the optical waveguide can be relatively reduced on the modulation substrate side, and further, the confinement of the optical waveguide in the radio frequency interaction part can be weakened to make the optical waveguide into a single mode. Thereby, the extinction ratio is improved. Further, by increasing the thickness of the titanium layer for forming the optical waveguide in the connection substrate, the confinement of the optical waveguide in the curved area can be made strong, and further, loss due to light radiated from the curve can be reduced.

EXAMPLES

Example 1

The optical modulator 41 shown in FIGS. 1 to 4 was manufactured.

In particular, an X-cut 3-inch wafer ($LiNbO_3$ single crystal) is used as a substrate, and a Mach-Zehnder optical waveguide is formed on a surface of the wafer by titanium diffusion process and photolithographic method. The size of the optical waveguide is, for example, 10 µm, at $1/e^2$. Subsequently, a signal electrode and a ground electrode are formed by plating process.

Next, a grinding dummy substrate is fixed to a grinding surface plate, and the substrate for modulator is stuck thereon with the electrode surface facing downwardly. Further, the modulation substrate 44 is thinned by horizontal grinding, lap and polishing (CMP). Thereafter, the substrate 44 is adhered to the flat plate-like supporting substrate 4. An end surface (a connection part for an optical fiber) of the optical waveguide is end surface-polished and the wafer is cut into chips by dicing. Each chip has a width of 2 mm.

The inclination angle of 6 degrees is formed on the end surface for suppressing return light reflected at the junction part of RF modulation substrate. A chip joined face is end surface skew-polished and then, an AR coat film is formed by vapor deposition.

Meanwhile, an X-cut 3-inch wafer ($LiNbO_3$ single crystal) is used as a substrate, and a Mach-Zehnder optical waveguide is formed on a surface of the wafer by titanium diffusion process and photolithographic method. The size of the optical waveguide is, for example, 10 µm, at $1/e^2$. Subsequently, the wafer is processed to obtain the connection substrate 48 with a width of 2 mm. The inclination angle of 6 degrees is formed on a joint surface of the connection substrate.

Next, a grinding dummy substrate is fixed to a grinding surface plate, and the substrate for connection is stuck thereon. Further, the connection substrate is thinned by horizontal grinding, lap and polishing (CMP). Thereafter, the substrate 48 is adhered to the flat plate-like supporting substrate 2. An end surface (a connection part for an optical fiber) of the optical waveguide is end surface-polished and the wafer is cut into chips by dicing. Each chip has a width of 2 mm.

Both of the substrates are aligned by observing guided-wave light of the optical waveguide and joined using an ultraviolet curable resin adhesive to obtain the modulator 41 of FIGS. 1 to 4. It should be noted that a gap between the signal electrode and the ground electrode is 13.5 µm, and a thickness of each electrode is 6 µm. A curvature radius of each curve of the optical waveguide is 15 mm. Each parameter is set as follows.

P1: 5 µm
P2: 8 µm
A1: 100 µm
A2: 100 µm
S1: 500 µm
S2: 497 µm

Coupling loss at a chip joined portion of the joined optical waveguide is measured and as a result, the loss is 0.2 dB. Further, the reflection attenuation amount of incident light is sufficiently secured, and the light source is confirmed to be not affected. A microwave characteristics of the RF electrode formed on a RF modulator 5 are measured using a network analyzer and as a result, a −6 dB bandwidth of S21 of 25 GHz or higher is secured and the modulation of 40 Gb/s is confirmed to be allowed.

Further, a polarization maintaining optical fiber is optically coupled to an incident-side end surface of the optical waveguide, and a single-mode optical fiber is optically coupled to an output-side end surface of the optical waveguide on the connection substrate. The optical insertion loss is measured, resulting in −6 dB.

Example 2

Both of the substrates are aligned by observing guided-wave light of the optical waveguide and joined using an ultraviolet curable resin adhesive to obtain the modulator 41 of FIGS. 1 to 4. It should be noted that a gap between the signal electrode and the ground electrode is 13.5 µm, and a thickness of each electrode is 6 µm. A curvature radius of each curve of the optical waveguide is 15 mm. Each parameter is set as follows.

P1: 5 µm
P2: 5.5 µm
A1: 100 µm
A2: 100 µm
S1: 500 µm
S2: 499.5 µm

Coupling loss at a chip bonding portion of the joined optical waveguide is measured and as a result, the loss is 0.05 dB. Further, the return loss of incident light is sufficiently secured, and the light source is confirmed not to be affected. Microwave characteristics of the RF electrode formed on the RF modulator 5 are measured using a network analyzer and as a result, a −6 dB bandwidth of S21 of 25 GHz or higher is secured and the modulation of 40 Gb/s is confirmed to be allowed.

Comparative Example 1

An optical modulator having the same material and size as those of the example 1 was manufactured. It should be noted that the modulation substrate and the connection substrate are not separated, but integrated into one modulation substrate. A thickness of the one substrate is made constant, a thickness of the one modulation substrate is 5 µm and a thickness of the one supporting substrate is 500 µm.

A microwave characteristics of the RF electrode formed on the RF modulator 5 are measured using a network analyzer and as a result, a −6 dB bandwidth of S21 of 25 GHz or higher is secured and the modulation of 40 Gb/s is confirmed to be allowed. Further, a polarization maintaining optical fiber is optically coupled to an incident-side end surface of the optical waveguide, and a single-mode optical fiber is optically coupled to an output-side end surface of the optical waveguide on the connection substrate. The optical insertion loss is measured, resulting in −12 dB.

Comparative Example 2

An optical modulator having the same material and size as those of the example 1 was manufactured. It should be noted that each size parameter is set as follows.

P1: 5 µm
P2: the same size as P1
A1: 100 µm
A2: 100 µm
S1: 500 µm
S2: 500 µm

Microwave characteristics of the RF electrode formed on the RF modulator 5 are measured using a network analyzer and as a result, a −6 dB bandwidth of S21 of 25 GHz or higher is secured and the modulation of 40 Gb/s is confirmed to be allowed. Further, a polarization maintaining optical fiber is optically coupled to an input-side end surface of the optical waveguide, and a single-mode optical fiber is optically coupled to an output-side end surface of the optical waveguide on the connection substrate. The optical insertion loss is measured, resulting in −12 dB.

The invention claimed is:

1. An optical modulator comprising an optical modulation part and a connection part for an optical fiber propagating light:

the optical modulation part comprising a modulation substrate comprising an electro-optic material having a first end face and a second end face, a modulation optical waveguide formed on the modulation substrate, a radio frequency interaction portion for applying a voltage on the modulation optical waveguide to modulate propagation light, a first supporting substrate comprising a first end face and a second end face and a first adhesion layer for adhering the modulation substrate to the first supporting substrate, the first adhesion layer comprising a first end face and a second end face;

the connection part comprising a connection substrate comprising an electro-optic material having a first end face and a second end face, a connection optical waveguide formed on the connection substrate, a second supporting substrate comprising a first end face and a second end face and a second adhesion layer for adhering the connection substrate to the second supporting substrate, the second adhesion layer comprising a first end face and a second end face;

wherein the first end face of the modulation substrate is directly adhered to the second end face of the connection substrate, wherein the first end face of the first supporting substrate is directly adhered to the second end face of the second supporting substrate, wherein an end face of the modulation optical waveguide at the first end face of the modulation substrate is connected to and directly contacts an end face of the connection optical waveguide at the second end face of the connection substrate, and wherein a thickness of the modulation substrate is smaller than that of the connection substrate.

2. The optical modulator of claim 1, wherein a thickness of the modulation substrate is 10 µm or less.

3. The optical modulator of claim 1, wherein a difference between a thickness of the modulation substrate and that of the connection substrate is 0.5 μm or more.

4. The optical modulator of claim 1, wherein the connection substrate is adhered also to the first adhesion layer.

5. The optical modulator of claim 1, wherein a joint surface of the modulation substrate to the connection substrate is inclined to a plane perpendicular to a traveling direction of propagation light in the modulation optical waveguide.

6. The optical modulator of claim 1, wherein the modulation substrate and the connection substrate are made of the same kind of material.

7. The optical modulator of claim 1, wherein the connection optical waveguide of the connection part has a multiplexing section or a demultiplexing section.

* * * * *

UNITED STATES PATENT AND TRADEMARK OFFICE
CERTIFICATE OF CORRECTION

PATENT NO.        : 7,778,497 B2                                              Page 1 of 1
APPLICATION NO. : 12/401753
DATED             : August 17, 2010
INVENTOR(S)       : Osamu Mitomi et al.

It is certified that error appears in the above-identified patent and that said Letters Patent is hereby corrected as shown below:

Title Page, Item (30), Foreign Application Priority Data:
  *please change* "Mar. 13, 2008   (JP) ...... P2000-064101" to
--Mar. 13, 2008 (JP) ...... P2008-064101--

Signed and Sealed this

Sixteenth Day of November, 2010

David J. Kappos
*Director of the United States Patent and Trademark Office*